UNITED STATES PATENT OFFICE.

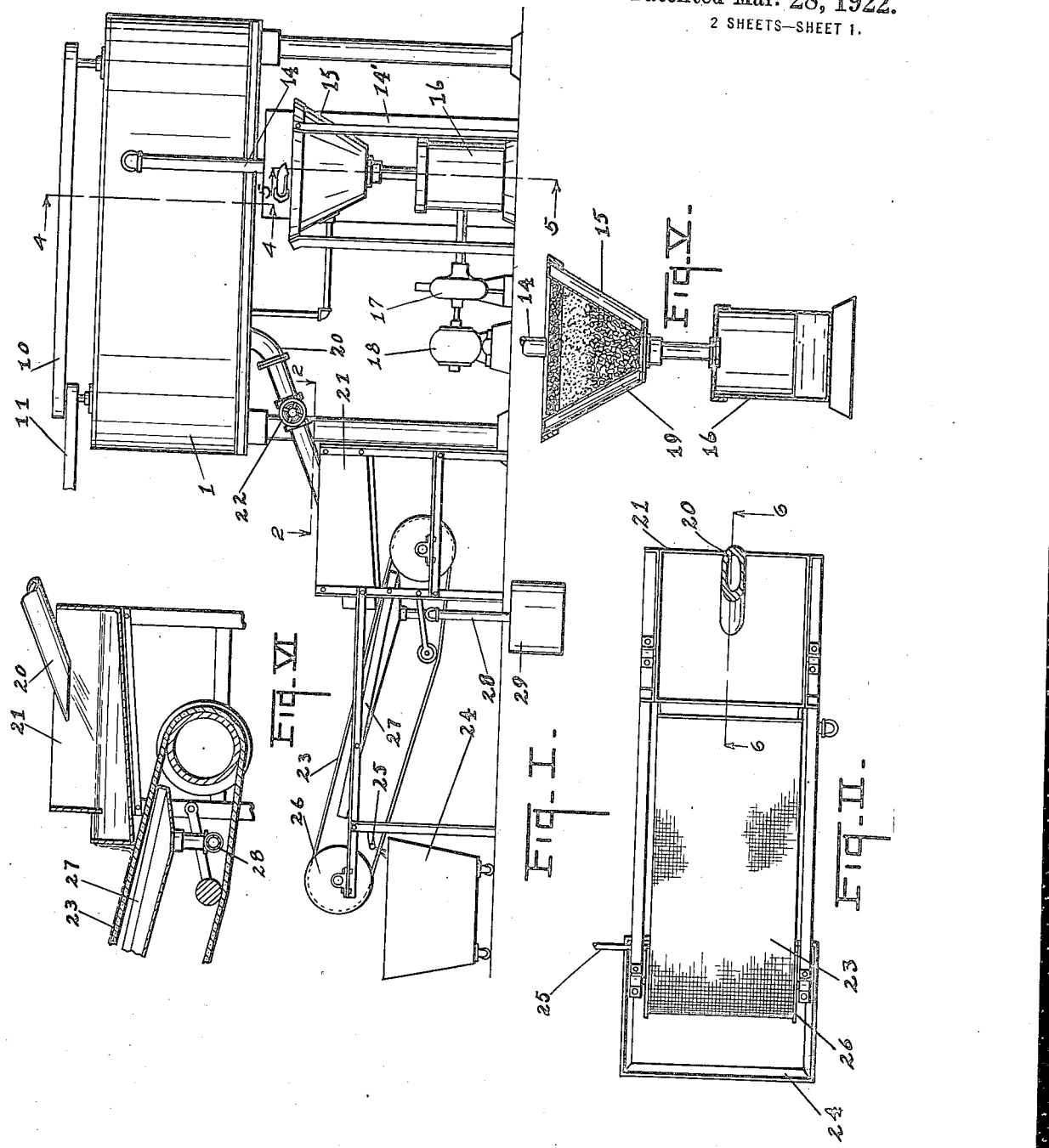

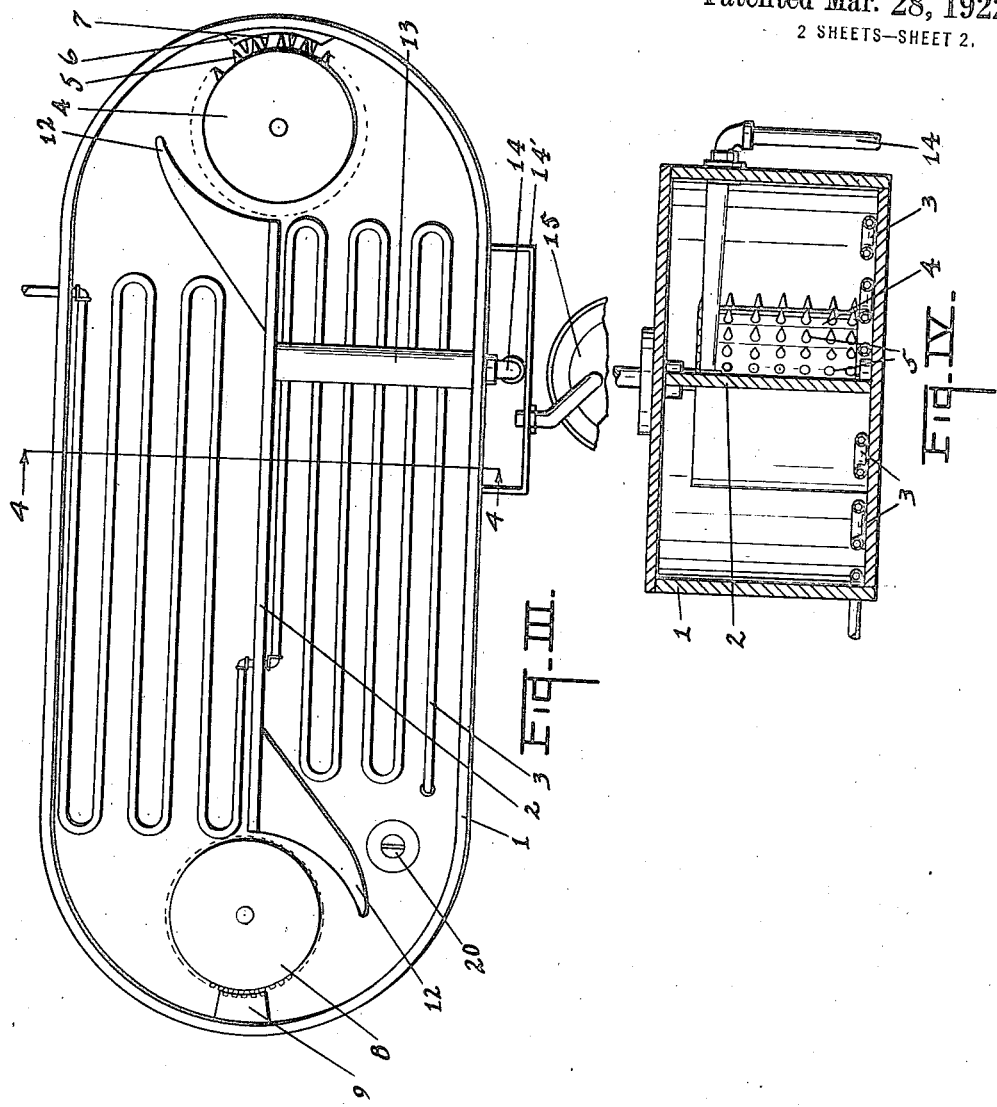

STEPHEN HOYT DUNWELL, OF PLAINWELL, MICHIGAN.

PROCESS FOR TREATING WAXED PAPER STOCK.

1,410,739.   Specification of Letters Patent.   Patented Mar. 28, 1922.

Application filed April 15, 1919. Serial No. 290,203.

*To all whom it may concern:*

Be it known that I, STEPHEN HOYT DUNWELL, citizen of the United States, residing at Plainwell, county of Allegan, State of Michigan, have invented certain new and useful Improvements in Processes for Treating Waxed Paper Stock, of which the following is a specification.

This invention relates to improvements in processes for treating waxed paper stock.

The main objects of this invention are:

First, to provide a process for treating waxed paper stock for removing the wax and reducing the stock to paper pulp which enables the economical and effective treatment of such stock.

Second, to provide an improved process for treating waxed paper stock to remove the wax and reduce the stock to paper pulp which results in the recovery of a substantial portion of the wax and the production of a good quality of paper pulp.

Third, to provide an improved process for treating waxed paper stock and removing the wax by which not only a considerable portion of the recovered wax may be utilized, but also a substantial amount of the size or aluminum compound and other chemicals in the stock may be recovered.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side elevation of a stock treating apparatus embodying the features of my invention, the parts being shown mainly in conventional form and without regard to relative proportions.

Fig. II is a plan view partially in section on a line corresponding to line 2—2 of Fig. I.

Fig. III is a plan view of the disintegrating or beater engine employed.

Fig. IV is a transverse section on a line corresponding to line 4—4 of Figs. I and III.

Fig. V is a detail vertical section through the wax recovering apparatus on a line corresponding to line 5—5 of Figs. I and III.

Fig. VI is a detail view partially in vertical section on a line corresponding to line 6—6 of Fig. II.

In the drawing similar reference characters refer to similar parts throughout the several views and the sectional views are taken looking in the direction of the little arrows at the ends of the section lines.

The apparatus illustrated is well adapted for the carrying out of certain steps of my improved process and therefore I have illustrated and described the same herein.

In the apparatus illustrated the tank or trough 1 resembles in form and size that of a well-known type of beater engine and has a central mid feather or partition 2.

In the bottom of the trough are heating coils 3, or the trough may be heated by the admission of steam directly thereto. At one end of the mid feather 2 is a vertical shredding roll 4 having teeth 5.

The coacting concave 6 is provided with teeth 7 and at the other end of the mid feather is a beater roll 8 and coacting bed plate 9. These rolls are connected by the belt 10 and driven from the belt 11.

The mid feather 2 is provided with deflector-like extensions 12 at its ends projecting to the rear of the shredder and beater rolls. Extending across the channel of the trough at the rear of the beater roll and in position to skim the matter floating on the surface is a trough-like skimmer 13. This skimmer is connected by the pipe 14 to the tank 14' which serves as a separating tank to separate the water skimmed off with the wax from the wax which is delivered from the tank 14' to the filter 15.

A suction pump 17 driven from a motor 18 is connected to this tank to facilitate the drawing of the material through the filter. The filter has a steam jacket 19 so that it may be heated as desired.

The discharge 20 of the tank 1 is delivered into the stock box 21, the pipe being controlled by the valve 22. This stock box is arranged so that it overflows or delivers upon the belt screen 23 disposed with its rear end in elevated position to deliver to the box 24.

A spray pipe 25 is arranged to spray upon the lower reach of the belt as it leaves the rear supporting roller 26 so that any adhering pulp is washed from the belt.

A pan or trough 27 is disposed below the upper reach of the belt to receive the solution draining through it, the trough being connected by the pipe 28 to deliver to the storage tank.

As stated, the various parts of the apparatus illustrated are shown mainly in conventional form and without particular regard to the relative proportions which would be varied according to the particular capacity desired in the apparatus and particular installations.

Having described the apparatus, I will now describe the manner of carrying out my improved process therewith: The stock to be treated, such as paraffined or other waxed paper stock is placed in the trough 1 with water containing hydrochloric acid or an equivalent acid in sufficient quantities to react on the size or aluminum compound in the stock, the solution being heated to above the melting point of paraffin or wax to be removed, 150° Fahr. being satisfactory for the treatment of paraffin waxed stock. The stock is introduced so that it first passes the shredding roll by which the stock is torn into fragments. It then passes through the beater roll, it being intended to illustrate in Fig. I a beater roll and bed plate of well-known type disposed vertically. The stock, while subject to this acid solution, is repeatedly passed through the shredder and beater rolls until reduced to the state desired. A sufficient quantity of the acid, preferably hydrochloric, is used to react on the size in the paper, which frees the binder and filler, greatly facilitating the disintegration of the paper or the separation of the fibres and consequently the release of the paraffin without severe grinding action or such a grinding action as would destroy or injure the fibres of the stock. The freed wax rises to the surface of the solution which, as soon as there is a considerable amount freed, is increased in depth until the skimmer is partially submerged, so that as the solution flows about the tank the liquefied wax material floating on the surface is skimmed off and passed through the filter into the tank 16.

When the treatment in the trough 1 is completed the stock is drawn off through the valve 22 into the stock box 21 from whence it flows on the screen 23 which drains the solution therefrom, the stock being delivered to the box 24 and the solution to the tank 29.

As a further step in treating the stock it is subjected in the tank 1 or, in practice, in a second apparatus or engine, to an alkaline solution such as soda ash adapted to produce saponification of remaining wax and other resinous and oily substances, remaining filler being carried off or removed by the soap or saponified mass as a vehicle, the pulp remaining being found to be quite free of wax and also of filler, and other material, which it is desirable to remove.

The acid solution from the first treatment may be treated to reclaim the portions of the size by comparatively simple and practical methods, which will be well understood by chemists and those practiced in the chemical arts, but, as such recovery steps or processes form no part of this invention, I do not describe the same herein.

The residuum and soap product skimmed off or removed from the second treatment tank may be heated and filtered to take out dirt and foreign insoluble matter leaving a soap product which may be variously used. The word "size" is used in the specification and in the following claims in a broad or general sense, as it is frequently used in the paper making industry, to designate the aluminum compounds which are or may be present in sized paper. This general term is used as it is found that the specific chemical designation of the aluminum compounds or aluminates present does not appear to be practical.

My improved process and apparatus enables the effective treatment of paper stock which is now quite generally considered worthless and is destroyed as waste in very large quantities. The process results both in the recovery of the wax, which has a substantial value, and also the recovery of the fibre for re-use in the manufacture of paper.

Having thus described my invention, what I claim as new and desire to secure by Letters Patent, is:

1. The process of treating waxed paper stock to remove the wax and reduce the stock to paper pulp comprising subjecting the stock to a solution containing hydrochloric acid in sufficient quantities to react on the size in the stock, the solution being heated to 150° Fahr. or above and while in such heated solution subjecting to a shredding and beating means, removing the wax rising to the surface of the solution, and draining the solution from the treated stock, and subjecting the treated stock to an alkaline solution adapted to produce saponification of remaining oily substances, remaining filler being carried by and removed therewith, the stock being subjected while in the second solution to a beating means.

2. The process of treating waxed paper stock to remove the wax and reduce the stock to paper pulp comprising subjecting the stock to a heated solution containing an acid in sufficient quantities to react, on the size in the stock and while in such heated solution subjecting to a mechanical disintegrating means, removing the wax rising to the surface of the solution, and draining the solution from the treated stock, and subjecting the treated stock to an alkaline solution adapted to produce saponification of remaining oily substances, remaining filler being carried by and removed therewith, the stock being subjected while in the second solution to a beating means.

3. The process of treating waxed paper stock comprising subjecting the stock to a heated solution containing an acid in sufficient quantities to react on the size in the stock, removing wax rising to the surface of the solution and draining the solution from the treated stock, and subjecting the treated stock to an alkaline solution adapted to produce saponification of remaining oily substances, the soapy residuum forming a vehicle for removing filler from stock.

4. The process of treating waxed stock to remove the wax and reduce the stock including subjecting the stock to a solution containing hydrochloric acid in quantities to react on the size in the stock, the solution being heated to 150° Fahr., or above, and while in such heated solution subjecting to a shredding and beating means, and removing the wax rising to the surface of the solution.

5. The process of treating waxed stock to remove the wax including subjecting the stock to a heated solution containing an acid in sufficient quantities to react on the size in the stock, and while in such heated solution subjecting to a shredding and beating means, and removing wax rising to the surface of the solution.

6. The process of treating waxed paper stock to remove the wax and reduce to paper pulp comprising subjecting the stock to the successive action of a shredding means and a beating means while in a heated solution containing an acid adapted to react on the size in the paper, thereby facilitating the disintegrating and release of the wax.

7. The process of treating waxed stock to remove the wax, subjecting the stock to a mechanical disintegrating means while in a heated solution containing an acid adapted to react on the size in the paper and thereby facilitate the disintegrating of papers and the releasing of the wax.

8. The process of treating waxed paper stock for the removal of the wax and reduction to paper pulp consisting of subjecting the stock while in a heated solution containing an acid re-agent for the size in the stock to a shredding and beating means.

9. The process of treating waxed paper stock for the removal of the wax and reduction to paper pulp consisting of subjecting the stock while in a heated solution containing an acid re-agent for the size in the stock to a mechanical disintegrating means.

10. The process of treating waxed stock for the removal of the wax including the subjecting of the stock to a heated solution containing an acid re-agent for the size in the stock and thereby facilitate the release of the wax.

In witness whereof, I have hereunto set my hand and seal in the presence of two witnesses.

STEPHEN HOYT DUNWELL. [L. S.]

Witnesses:
LUELLA G. GREENFIELD,
MARGARET L. GLASGOW.